US009335801B2

(12) United States Patent
Chuang et al.

(10) Patent No.: US 9,335,801 B2
(45) Date of Patent: May 10, 2016

(54) FRAME AND ELECTRONIC DEVICE HAVING THE SAME

(71) Applicant: HTC Corporation, Taoyuan County (TW)

(72) Inventors: I-Cheng Chuang, Taoyuan County (TW); Yu-Jing Liao, Taoyuan County (TW); Hsin-Chih Liu, Taoyuan County (TW); Hung-Wen Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 55 days.

(21) Appl. No.: 14/333,517

(22) Filed: Jul. 17, 2014

(65) Prior Publication Data
US 2016/0018862 A1    Jan. 21, 2016

(51) Int. Cl.
*G06F 1/20* (2006.01)
*H05K 7/20* (2006.01)

(52) U.S. Cl.
CPC ..................................... *G06F 1/203* (2013.01)

(58) Field of Classification Search
CPC ......... H05K 7/20; H05K 7/2039; H05K 7/14; H05K 7/1422; H05K 7/20145; H05K 7/20509; G06F 1/20; G06F 1/203; G06F 1/1616; G06F 1/1626; H01L 23/3677
USPC ............ 361/679.46, 679.54, 679.55, 679.56, 361/704, 705, 707, 708, 714, 719, 720; 165/80.2, 80.3, 104.33, 185; 175/50, 175/50.04, 15.1, 254; 312/223.2, 223.3, 312/236, 265; 257/707, 713, 718, 719; 29/592.1, 890.03
See application file for complete search history.

(56) References Cited

U.S. PATENT DOCUMENTS

| | | | | |
|---|---|---|---|---|
| 5,673,176 A * | 9/1997 | Penniman | ............ | H05K 7/1422 257/718 |
| 5,784,256 A * | 7/1998 | Nakamura | ............ | G06F 1/1616 257/712 |
| 5,973,920 A * | 10/1999 | Altic | ........................ | G06F 1/203 165/80.2 |
| 6,646,865 B2 * | 11/2003 | Huang | .................. | G06F 1/1656 312/223.2 |
| 7,684,198 B2 * | 3/2010 | Fang | ................... | H01L 23/3672 165/185 |
| 7,697,281 B2 * | 4/2010 | Dabov | .................. | G06F 1/1626 361/679.55 |
| 7,869,206 B2 * | 1/2011 | Dabov | .................. | G06F 1/1626 361/679.55 |

(Continued)

FOREIGN PATENT DOCUMENTS

TW            201424561         6/2014

OTHER PUBLICATIONS

"Office Action of Taiwan Counterpart Application," issued on Dec. 2, 2015, p. 1-p. 5, in which the listed reference was cited.

*Primary Examiner* — Michail V Datskovskiy
(74) *Attorney, Agent, or Firm* — Jianq Chyun IP Office (57) ABSTRACT

A frame to be assembled to a housing of an electronic device is provided. The frame includes a first material portion and a second material portion. The first material portion has a first thermal conductivity coefficient, and the second material portion has a second thermal conductivity coefficient. The first material portion is connected to the second material portion, and the first thermal conductivity coefficient is greater than the second thermal conductivity coefficient. A stiffness of the second material portion is greater than a stiffness of the first material portion. A heat generating element of the electronic device dissipates heat by the first material portion, and the heat generating element is disposed to be corresponding to the first material portion. An electronic device having said frame is also provided.

20 Claims, 6 Drawing Sheets

(56) References Cited

U.S. PATENT DOCUMENTS

| | | | |
|---|---|---|---|
| 8,391,010 B2 * | 3/2013 | Rothkopf | G06F 1/1626 313/46 |
| 9,049,801 B2 * | 6/2015 | Rothkopf | G06F 1/1626 |
| 9,072,199 B2 * | 6/2015 | Fowler | H05K 7/20509 |
| 2012/0044635 A1 * | 2/2012 | Rothkopf | G06F 1/1626 361/679.54 |
| 2012/0160449 A1 | 6/2012 | Fowler et al. | |
| 2013/0094144 A1 * | 4/2013 | Kayama | H05K 7/20145 361/692 |
| 2013/0141870 A1 * | 6/2013 | Rothkopf | G06F 1/1626 361/707 |

* cited by examiner

FRAME AND ELECTRONIC DEVICE HAVING THE SAME

BACKGROUND OF THE INVENTION

1. Field of the Invention

The invention relates to a frame and an electronic device having the frame, and more particularly, to a frame having favorable heat dissipation effect and an electronic device having the frame.

2. Description of Related Art

In recent years, with advancements in technology industry, information products such as notebook computers, tablet computers, and smart phones, have been widely used in daily life. Types and functions of the electronic devices are increasingly diversified, and the electronic devices have become more popular due to convenience and practicality thereof.

Generally, a frame is disposed in an electronic device in order to provide a supporting force required by the electronic device. To ensure that the frame has a sufficient strength, the frame is usually manufactured by metal materials such as a stainless steel. On the other hand, a central processing unit (CPU), a processing chip or other electronic elements are disposed in the electronic device, and these electronic elements will generate heat energy during operations. In addition to the supporting force, the frame can even conduct said heat energy to facilitate the electronic device in heat dissipation. However, the stainless steel with higher strength has a problem of low thermal conductivity coefficient, and thus the heat energy cannot be effectively conducted and dissipated. Accordingly, an overall operational performance of the electronic device may be seriously affected.

SUMMARY OF THE INVENTION

The invention provides a frame which has favorable heat dissipation effect.

The invention provides an electronic device having aforesaid frame for providing favorable heat dissipation effect.

A frame of the invention is configured to be assembled to a housing of an electronic device, and the electronic device includes a heat generating element. The frame includes a first material portion and a second material portion. The first material portion has a first thermal conductivity coefficient, and the second material portion has a second thermal conductivity coefficient. The first material portion is connected to the second material portion, the first then al conductivity coefficient is greater than the second thermal conductivity coefficient, a stiffness of the second material portion is greater than a stiffness of the first material portion, and the heat generating element is disposed to be corresponding to the first material portion. The heat generating element of the electronic device dissipates heat by the first material portion.

An electronic device of the invention includes a housing, a circuit board, and a frame. The circuit board is assembled in the housing, and has at least one heat generating element. The frame is assembled between a front cover and the circuit board. The frame includes a first material portion and a second material portion. The first material portion has a first thermal conductivity coefficient, and the second material portion has a second thermal conductivity coefficient. The first material portion is connected to the second material portion, the first thermal conductivity coefficient is greater than the second thermal conductivity coefficient, a stiffness of the second material portion is greater than a stiffness of the first material portion, and the heat generating element is disposed to be corresponding to the first material portion. The heat generating element of the electronic device dissipates heat by the first material portion.

Based on above, in the electronic device of the invention, the frame is composed of the first material portion and the second material portion being the different materials, wherein the thermal conductivity coefficient of the first material portion is greater than the thermal conductivity coefficient of the second material portion. Therefore, heat generated by the heat generating element that generates high heat energy in the electronic device may be rapidly conducted by the first material portion to evenly distribute heat across the portions with lower temperature in the electronic device. As a result, the electronic device can provide favorable heat dissipation effect.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
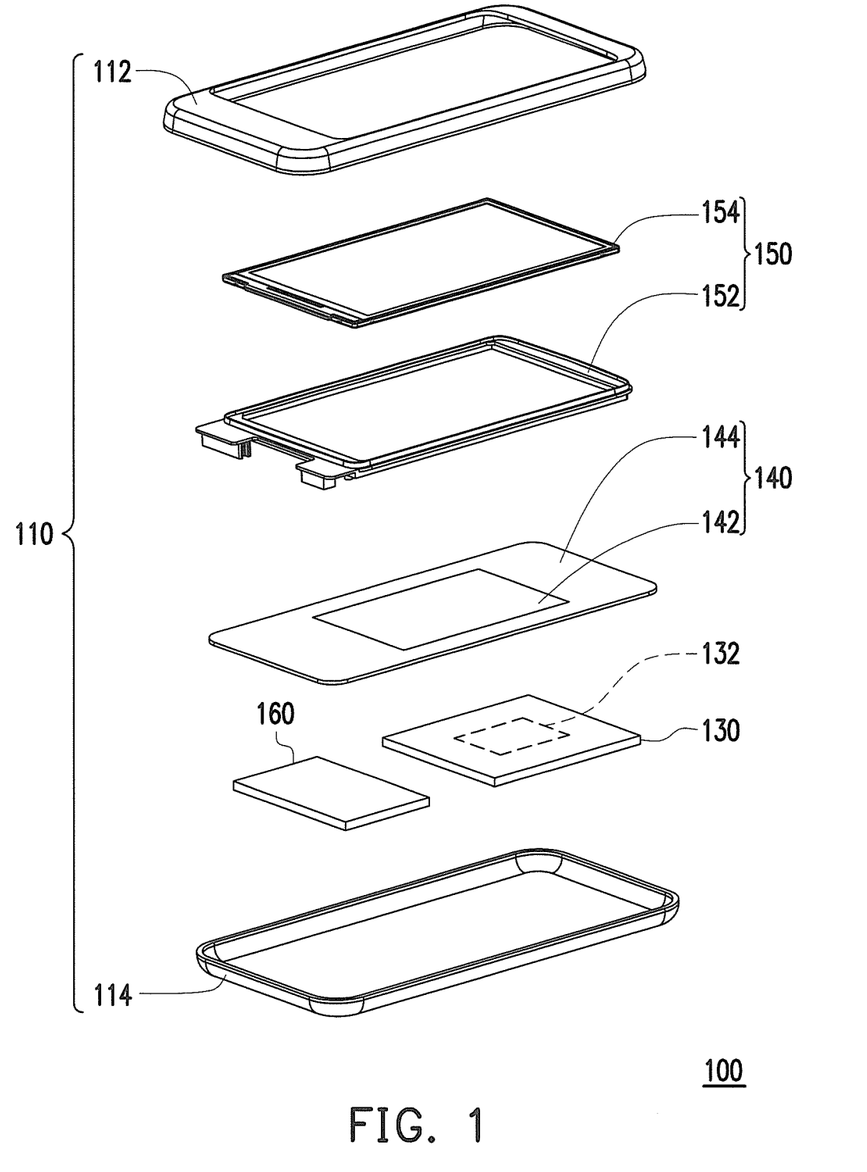
FIG. 1 is an explosion view of an electronic device according to an embodiment of the invention.

FIG. 1 is an explosion view of an electronic device according to an embodiment of the invention. Referring to FIG. 1, an electronic device 100 includes a housing, a circuit board 130, and a frame 140. The housing 110 of the present embodiment is assembled by using a front cover 112 and a back cover 114. However, the housing 110 may also be an unibody or assembled by using more components. As illustrated in FIG. 1, the circuit board 130 is assembled between the front cover 112 and the back cover 114, and has at least one heat generating element 132. The frame 140 is assembled between the front cover 112 and the circuit board 130, and served as an inner bracket of the electronic device 100 for providing a supporting force required by the electronic device 100. In the present embodiment, the electronic device 100 is a mobile phone for example, and the circuit board 130 and the frame 140 are, for example, locked onto the front cover 112 or the back cover 114 by a locking member to be securely assembled to the electronic device 100.

Figure 2:
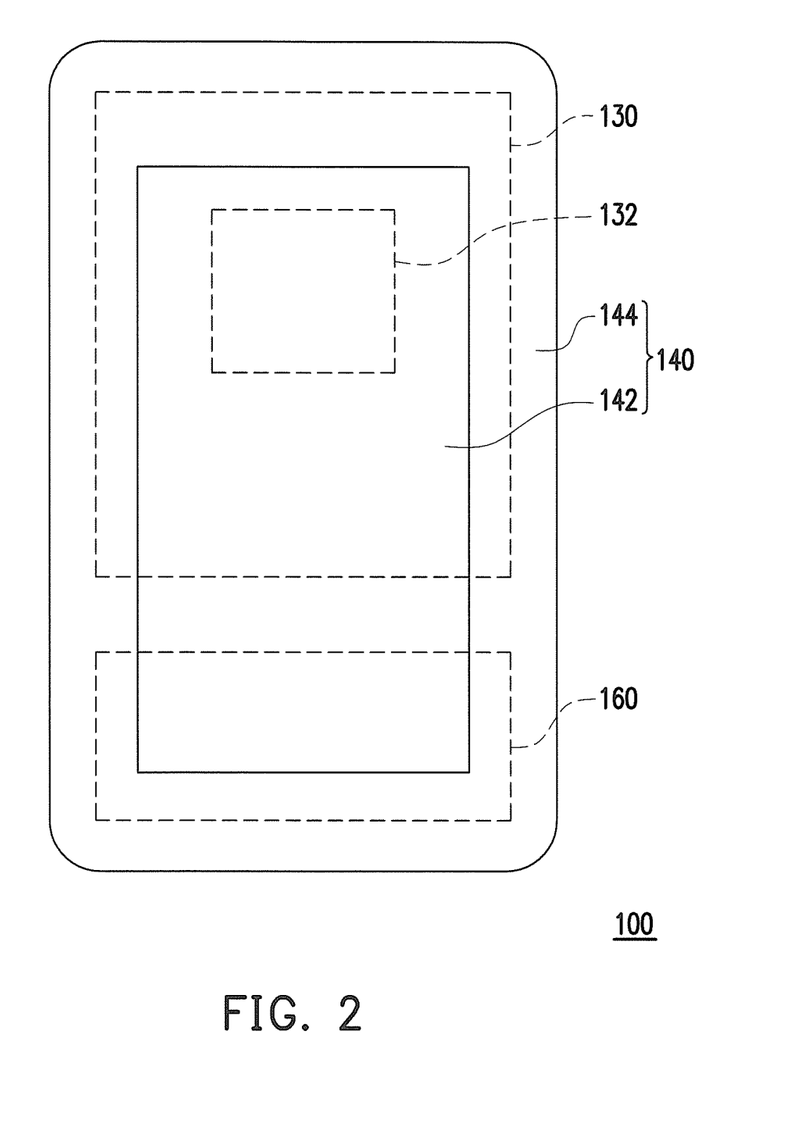
FIG. 2 is a partial top view of the electronic device depicted in FIG. 1.

FIG. 2 is a partial top view of the electronic device depicted in FIG. 1. For clarity of the diagram, FIG. 2 only illustrates parts of components in the electronic device 100. Referring to FIG. 1 and FIG. 2 together, the frame 140 includes a first material portion 142 and a second material portion 144. The first material portion 142 has a first thermal conductivity coefficient, and the second material portion 144 has a second thermal conductivity coefficient. The first material portion 142 is connected to the second material portion 144, and the first thermal conductivity coefficient is greater than the second thermal conductivity coefficient. As illustrated in the top view of FIG. 2, the heat generating element 132 of the electronic device 100 is disposed to be corresponding to the first material portion 142. For example, an orthogonal projection of the heat generating element 132 on the frame 140 falls within a partial region of the first material portion 142.

During operations of the electronic device 100, the heat generating element 132 on the circuit board 130 will generate heat, such that temperature at a position where the heat generating element 132 is located is higher than temperatures of other portions of the electronic device. In the present embodiment, the orthogonal projection of the heat generating element 132 on the frame 140 falls within the partial region of the first material portion 142 that has the higher thermal conductivity coefficient. Therefore, heat generated by the heat generating element 132 may be rapidly conducted to other portions of the frame 140 by the first material portion 142 (i.e., to evenly distribute heat across the portions with lower temperature in the electronic device 100). As a result, the electronic device 100 can provide favorable heat dissipation effect. It should be noted that, the orthogonal projection of the heat generating element 132 on the frame 140 of the present embodiment completely falls within the first material portion 142, such that a thermal conductivity area of the first material portion 142 may complete cover a heating generating area of the heat generating element 132.

In the present embodiment, the heat generating element 132 of the circuit board 130 is an electronic element which generates higher heat energy during operations of the electronic device 100, such as a central processor unit (CPU), a charging chip, a power management chip, or a radio frequency chip. By conducting heat generated by the heat generating element 132 by the first material portion 142 of the frame 140, the electronic device 100 can provide favorable heat dissipation effect to further maintain and stabilize overall performances of the electronic device 100.

As illustrated in FIG. 2, in the present embodiment, the second material portion 144 of the frame 140 is around the first material portion 142. In addition, a stiffness of the second material portion 144 is greater than a stiffness of the first material portion 142. For instance, in the present embodiment, a material of the first material portion 142 is an aluminum alloy or a copper alloy, and a material of the second material portion 144 is a stainless steel. However, the materials of the first material portion 142 and the second material portion 144 may also be a plastic or other materials, as long as a thermal conductivity efficiency of the material of the first material portion 142 is higher than a thermal conductivity efficiency of the material of the second material portion 144 and the stiffness of the second material portion 144 is greater than the stiffness of the first material portion 142. Generally, corners and edges of the electronic device 100 are prone to damage due to external forces. For example, when the electronic device 100 falls down to the ground, a defect is usually generated at one specific corner. In the present embodiment, strengths of the corners and edges of the electronic device 100 may be ensured by disposing the second material portion 144 having the greater stiffness at periphery of the frame 140. Accordingly, the electronic device 100 can provide favorable heat dissipation effect and the strengths. Herein, the first material portion 142 is uniformly composed of the same material or a composite material and the second material portion 144 is also uniformly composed of the same material or a composite material, but the materials of the first material portion 142 and the second material portion 144 are different.

In another embodiment which is not illustrated, the second material portion 144 of the frame 140 is around the first material portion 142. The invention is not intended to limit relative positions and relative sizes of the first material portion 142 and the second material portion 144. As long as a position of the first material portion 142 is corresponding to a position of the heat generating element 132 so that the orthogonal projection of the heat generating element 132 on the frame 140 falls within the partial region of the first material portion 142, the electronic device 100 is capable of providing favorable heat dissipation effect.

Figure 3A:
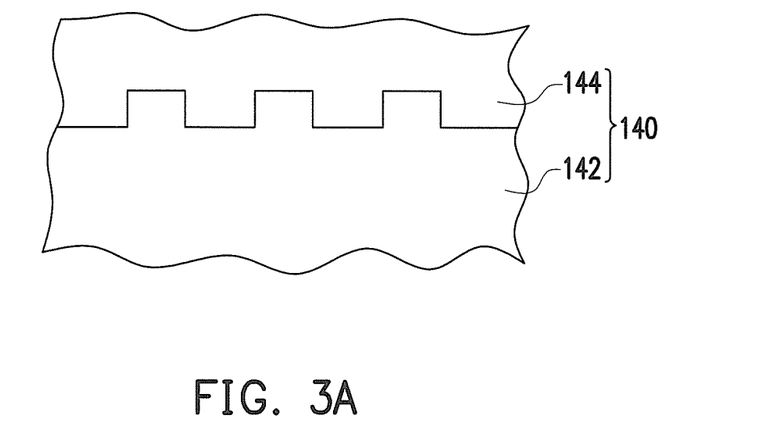
FIG. 3A is a top view of a connected portion of the first material portion and the second material portion depicted in FIG. 2.
Figure 3B:
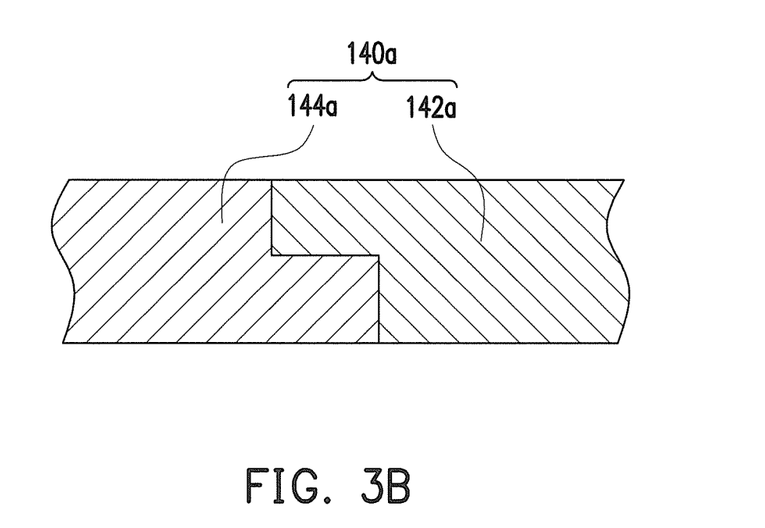
FIG. 3B is a cross-sectional view of the frame according to another embodiment of the invention.

FIG. 3A is a top view of a connected portion of the first material portion and the second material portion depicted in FIG. 2. Referring to FIG. 3A, in the present embodiment, the first material portion 142 and the second material portion 144 may be connected together by ways of locking, gluing, riveting, soldering or other suitable methods. As illustrated in FIG. 3A, the first material portion 142 is scarf-jointed with the second material portion 144, so that the first material portion 142 may be stably connected to the second material portion 144 in order to prevent the first material portion 142 from being detached from the second material portion 144 in case the electronic device 100 falls down or receives any external forces. In the present embodiment, the first material portion 142 and the second material portion 144 are located on the same plane. In other words, taking a viewpoint in a direction facing the drawing of FIG. 3, the first material portion 142 and the second material portion 144 are not overlapped, but the invention is not limited thereto. FIG. 3B is a cross-sectional view of the frame according to another embodiment of the invention. As illustrated in FIG. 3B, a first material portion 142a and a second material portion 144a of a frame 140a are overlappingly bonded, and have an overlapped portion in a thickness direction.

Figure 4A:
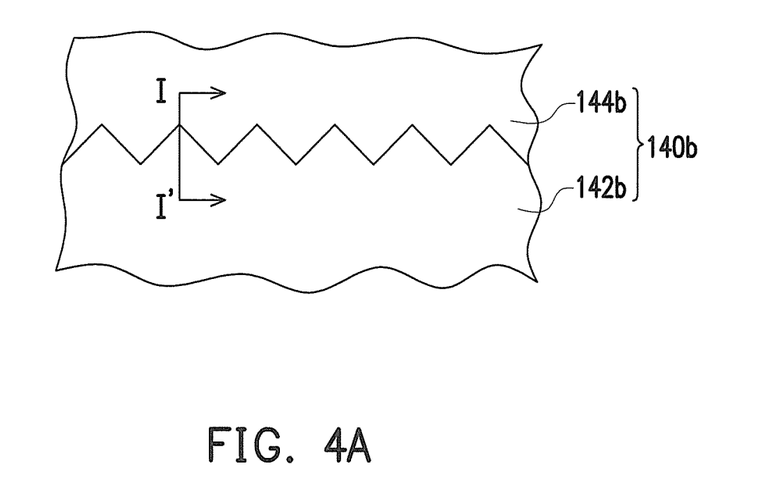
FIG. 4A is a partial top view of the frame according to another embodiment of the invention.
Figure 4B:
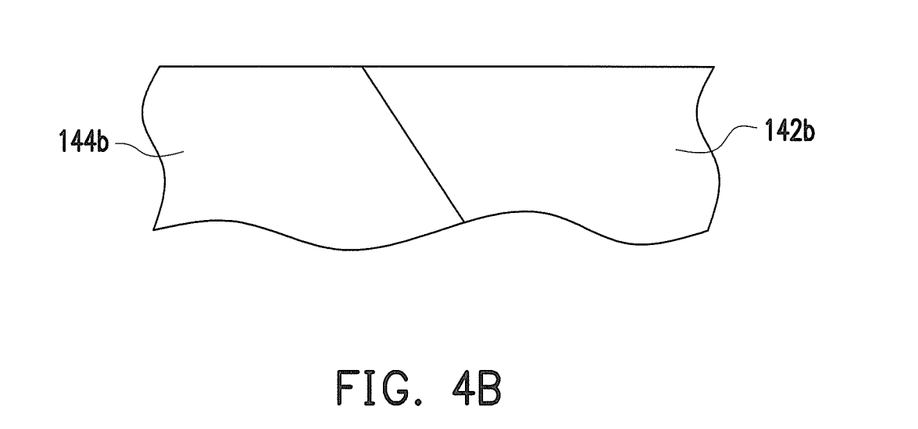
FIG. 4B is a cross-sectional view of FIG. 4A along line I-I'.

FIG. 4A is a partial top view of the frame according to another embodiment of the invention. FIG. 4B is a cross-sectional view of FIG. 4A along line I-I'. Referring to FIG. 4A and FIG. 4B together, in the present embodiment, a first material portion 142b and a second material portion 144b of a frame 140b are overlappingly bonded, and an edge of the first material portion 142b overlappingly bonded with the second material portion 144b is zigzag-shaped. As illustrated in FIG. 4B, a zigzag-shaped portion of the first material portion 142b is pressed into the second material portion 144b. In the present embodiment, the zigzag-shaped edge is capable of increasing contact areas of the first material portion 142b and the second material portion 144b. Accordingly, areas for conducing heat may also be increased, so that the electronic device can have favorable heat dissipation effect.

Referring to FIG. 1, in the present embodiment, the electronic device 100 further includes a display module 150 and a battery module 160. The display module 150 is disposed between the frame 140 and the front cover 112, and the display module 150 includes an outer frame 152 and a display panel 154, wherein the outer frame 152 carries the display panel 154. The battery module 160 is disposed between the frame 140 and the back cover 114. The display module 150 makes the electronic device 100 able to provide a display function, and the battery module 160 is capable providing electrical energy required by the electronic device 100 during operations.

As shown in FIG. 1, the battery module 160 and the circuit board 130 of the present embodiment are located at the same side of the frame 140, and the display module 150 is located at another side of the frame 140. The battery module 160 and the circuit board 130 are located side by side, and the battery module 160 and the circuit board 130 are located on the same plane. In addition, the electronic device 100 may further include a touch panel (no illustrated), disposed between the front cover 112 and the display module 150, such that the electronic device 100 may include both display and touch functions. Alternatively, the display module 150 may also be integrated with the touch function.

It should be noted that, relative positions of the battery module and the circuit board are not limited by the foregoing embodiments, and said relative positions may be changed according to shapes and sizes of the battery module and the circuit board.

Hereinafter, the reference numerals and a part of the contents in the previous embodiment are used in the present embodiment, in which identical reference numerals indicate identical or similar components, and repeated description of the same technical contents is omitted. For a detailed description of the omitted parts, reference can be found in the previous embodiment, and no repeated description is contained in the following embodiments.

Figure 5:
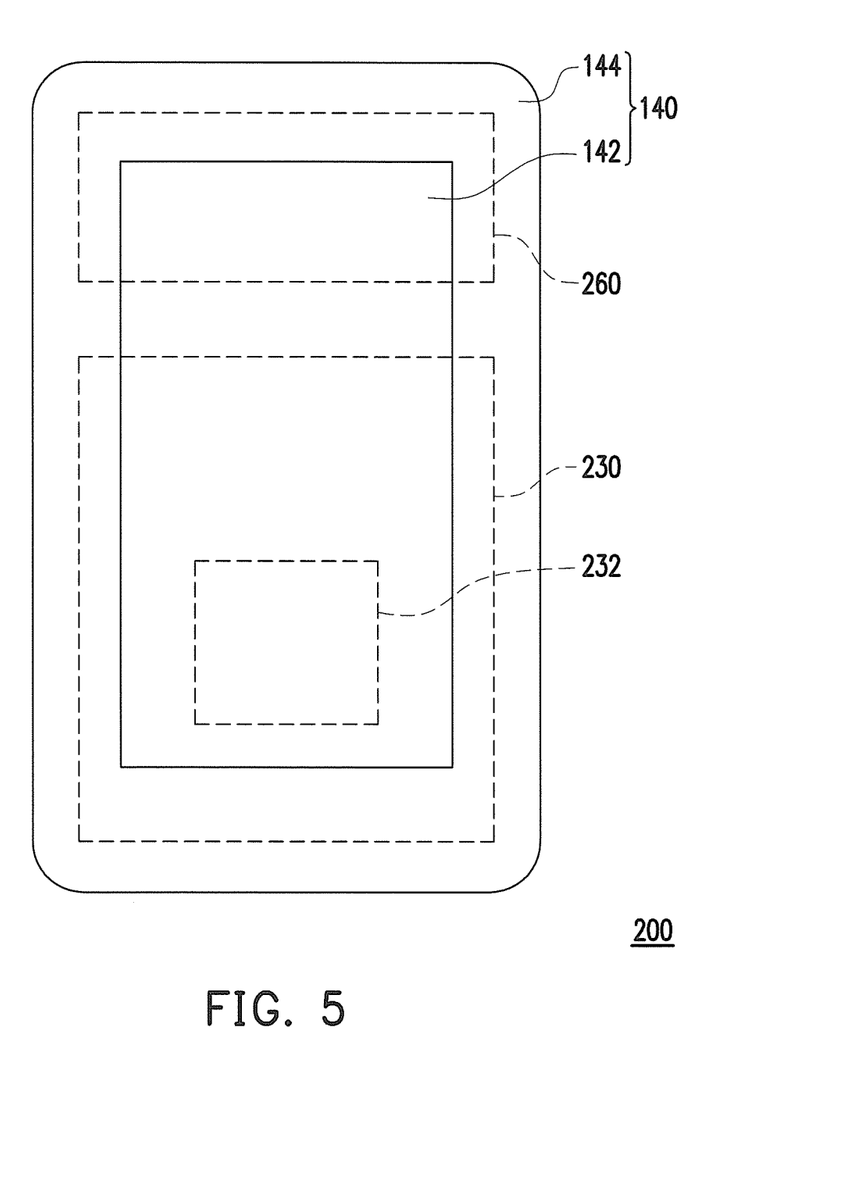
FIG. 5 is a partial top view of an electronic device according to yet another embodiment of the invention.
Figure 6:
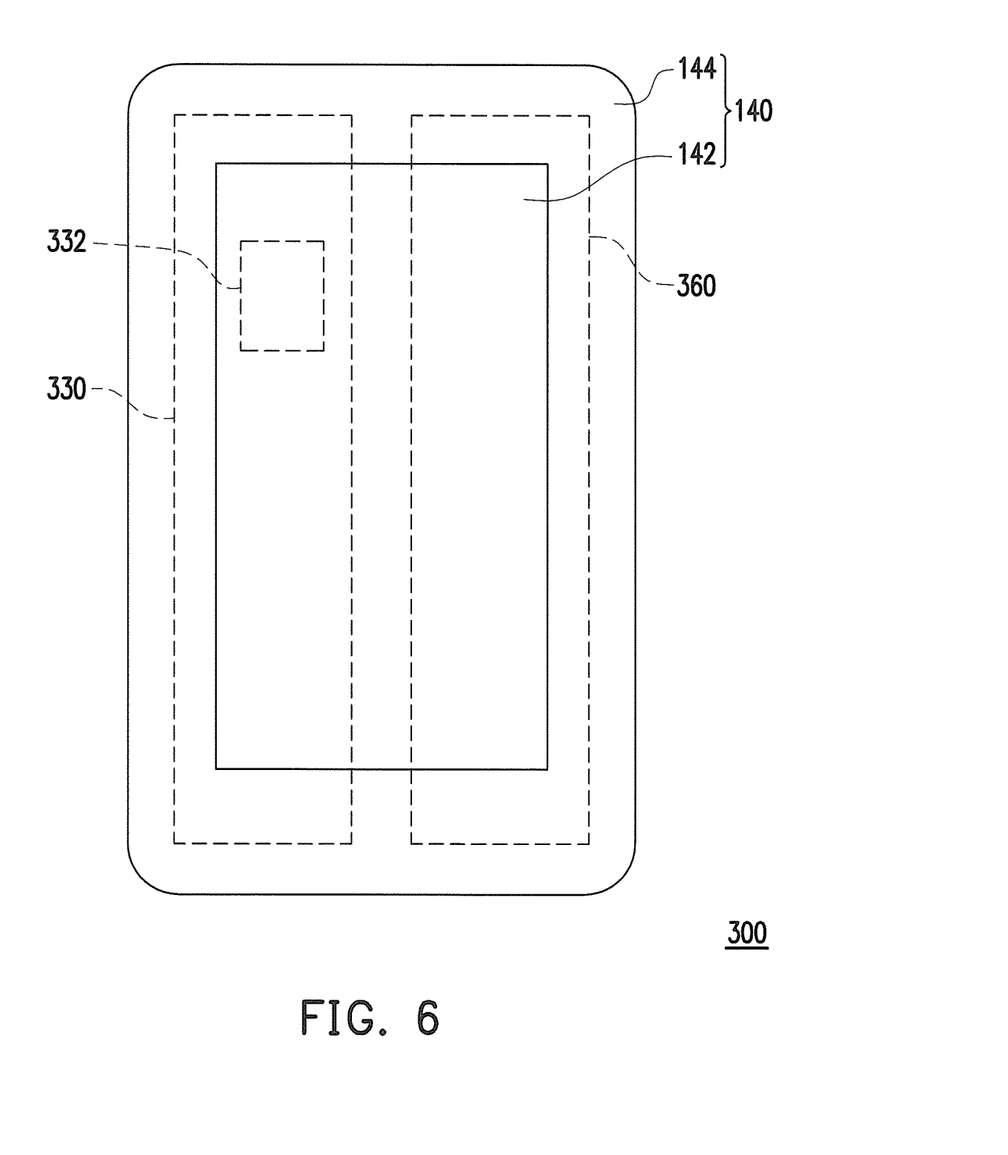
FIG. 6 is a partial top view of an electronic device according to yet another embodiment of the invention.

FIG. 5 is a partial top view of an electronic device according to yet another embodiment of the invention. FIG. 6 is a partial top view of an electronic device according to yet another embodiment of the invention. For clarity of the diagram, FIG. 5 and FIG. 6 only illustrate parts of components in the electronic devices. Referring to FIG. 5, the embodiment of FIG. 5 is substantially similar to the embodiment of FIG. 1, a major difference between two is that, in the embodiment of FIG. 5, a battery module 260 is located at upper part of drawing and a circuit board 230 is located at lower part of the drawing; whereas in the embodiment of FIG. 1, the battery module 160 is located at lower part of the drawing and the circuit board 130 is located at upper part of the drawing. Referring to FIG. 6, the embodiment of FIG. 6 is substantially similar to the embodiment of FIG. 1, a major difference between two is that, in the embodiment of FIG. 6, a battery module 360 and a circuit board 330 are strip shaped, and long edges of the battery module 360 and the circuit board 330 are both aligned to a long edge of the frame 140.

It should be noted that, in the embodiment of FIG. 5, an orthogonal projection of a heat generating element 232 of the circuit board 230 on the frame 140 also falls within the partial region of the first material portion 142. Similarly, in the embodiment of FIG. 6, an orthogonal projection of a heat generating element 332 of the circuit board 330 on the frame 140 also falls within the partial region of the first material portion 142. As a result, the electronic devices 200 and 300 can provide the favorable heat dissipation effect.

In summary, in the electronic device of the invention, the position of the heat generating element that generates higher heat energy is corresponding to the position of the first material portion that has the higher thermal conductivity coefficient, and the orthogonal projection of the heat generating element on the frame falls within the partial region of the first material portion. Accordingly, heat generated by the heat generating element may be rapidly conducted by the first material portion to evenly distribute heat across the portions with lower temperature in the electronic device. As a result, the electronic device can provide favorable heat dissipation effect.

In addition, the first material portion and the second material portion of the frame include different bonding method, and the relative positions and the relative sizes of the first material portion and the second material portion may be designed freely. On the hand, the position of the circuit board having the heat generating element may also be changed according to shapes and sizes thereof, such that the frame and the electronic device may be flexible in terms of design.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A frame, configured to be assembled to a housing of an electronic device, the electronic device comprising a heat generating element, and the frame comprising:
   a first material portion, having a first thermal conductivity coefficient; and
   a second material portion, having a second thermal conductivity coefficient, wherein a side surface of the first material portion is connected to a side surface of the second material portion such that the first material portion and the second material portion are connected laterally, the first thermal conductivity coefficient is greater than the second thermal conductivity coefficient, a stiffness of the second material portion is greater than a stiffness of the first material portion, and the heat generating element is disposed to be corresponding to the first material portion for the heat generating element to dissipate heat by the first material portion.

2. The frame of claim 1, wherein an orthogonal projection of the heat generating element on the frame falls within a partial region of the first material portion.

3. The frame of claim 1, wherein the second material portion is around the first material portion.

4. The frame of claim 1, wherein the first material portion is around the second material portion.

5. The frame of claim 1, wherein a material of the first material portion is an aluminum alloy or a copper alloy, and a material of the second material portion is a stainless steel.

6. The frame of claim 1, wherein the first material portion is scarf-jointed with the second material portion.

7. The frame of claim 1, wherein the first material portion and the second material portion are overlappingly bonded.

8. The frame of claim 7, wherein an edge of the first material portion overlappingly bonded with the second material portion is at least partially zigzag-shaped.

9. The frame of claim 8, wherein the zigzag-shaped portion of the first material portion is pressed into the second material portion.

10. An electronic device, comprising:
    a housing, having an accommodating space;
    a circuit board, assembled in the accommodating space, and having at least one heat generating element; and
    a frame, assembled in the accommodating space, and the frame comprising:
       a first material portion, having a first thermal conductivity coefficient; and
       a second material portion, having a second thermal conductivity coefficient, wherein a side surface of the first material portion is connected to a side surface of the second material portion such that the first material portion and the second material portion are connected laterally, the first thermal conductivity coefficient is greater than the second thermal conductivity coefficient, a stiffness of the second material portion is greater than a stiffness of the first material portion, and the heat generating element is disposed to be corresponding to the first material portion for the heat generating element to dissipate heat by the first material portion.

11. The electronic device of claim 10, wherein an orthogonal projection of the heat generating element on the frame falls within a partial region of the first material portion.

12. The electronic device of claim 10, wherein the second material portion is around the first material portion.

13. The electronic device of claim 10, wherein the first material portion is around the second material portion.

14. The electronic device of claim 10, wherein a material of the first material portion is an aluminum alloy or a copper alloy, and a material of the second material portion is a stainless steel.

15. The electronic device of claim 10, wherein the first material portion is scarf-jointed with the second material portion.

16. The electronic device of claim 10, wherein the first material portion and the second material portion are overlappingly bonded.

17. The electronic device of claim 10, wherein the heat generating element is a central processor unit, a charging chip, a power management chip, or a radio frequency chip.

18. The electronic device of claim 10, further comprising a display module, disposed between the frame and a front cover.

19. The electronic device of claim 18, wherein an edge of the first material portion overlappingly bonded with the second material portion is at least partially a zigzag-shaped portion.

20. The electronic device of claim 19, wherein the zigzag-shaped portion of the first material portion is pressed into the second material portion.

* * * * *